US005555782A

United States Patent [19]

Pagaza-Melero et al.

[11] Patent Number: 5,555,782

[45] Date of Patent: Sep. 17, 1996

[54] WASTE TIRE SLICING MACHINE

[75] Inventors: Gerardo Pagaza-Melero, Cuajimalpa; Raymundo Fernandez-Y-Sosa, Naucalpan de Juárez; Santiago Bastida-Sanchez; Agustin Bastida-Sanchez, both of Almolova de Juárez; Victor Pagaza-Melero, San Juan de Aragón; Jesus F. Pagaza-Melero, Toluca, all of Mexico

[73] Assignee: Gerardo Pagaza-Melero, Cuajimalpa, Mexico

[21] Appl. No.: 289,892

[22] Filed: Aug. 12, 1994

[30] Foreign Application Priority Data

Aug. 13, 1993 [MX] Mexico .................................. 934949

[51] Int. Cl.[6] ...................................................... B23B 5/14

[52] U.S. Cl. .................................................. 82/46; 83/951

[58] Field of Search ................................ 82/46, 48, 132, 82/137, 101; 83/171, 176, 951, 420, 422; 241/DIG. 31

[56] References Cited

U.S. PATENT DOCUMENTS

| | | | |
|---|---|---|---|
| 4,417,492 | 11/1983 | Winecoff | 82/46 |
| 4,682,522 | 7/1987 | Barclay | 83/951 X |
| 4,914,994 | 4/1990 | Barclay | 83/951 X |
| 5,235,888 | 8/1993 | Dom | 83/951 X |

*Primary Examiner*—M. Rachuba
*Assistant Examiner*— Henry Tsai
*Attorney, Agent, or Firm*—Darby & Darby, P.C.

[57] ABSTRACT

A slicing machine for cutting waste tires into pieces which can be stored in considerably compacted volumes for further use or disposal thereof. The machine includes a rotatively driven chuck plate having a plurality of perpendicularly arranged pins for supporting a waste tire by its beads, a freely rotatable follower plate driven by a pressure supplying fluid mechanism against the chuck plate, and knives arranged perpendicularly to the chuck plate and to the follower plate and extending towards each other over the edges of the plates, such that when the tire is pressed between the plates, the knives will slice and cut the tire.

10 Claims, 5 Drawing Sheets

WASTE TIRE SLICING MACHINE

FIELD OF THE INVENTION

The present invention refers to technique of slicing or cutting waste tires into the different elements constituting the same and, mope particularly, it is related to a waste tire slicing machine which offers a simple, practical and functional solution to the problems of storing and/or disposing of relatively large volumes of waste tires mainly generated by the motor vehicles.

BACKGROUND OF THE INVENTION

A great diversity of devices and machines for carrying out the cutting of specific materials, such as plastics, paper, wood, glass, metal, rubber, fabric, meat, etc. are very well known and broadly used in the art, as well as some others especially designed for cutting certain specific waste products and many other materials that may be transformed and re-used for the manufacture of other types of products or simply re-used for carrying out minor repairs in products similar to them.

The extreme complexity of the problems encountered in disposing of or finding a practical usefulness to the large volumes of waste tires that day by day are generated by all types of transportation vehicles, as well as by defective manufacture of said tires, has caused the gradual saturation of the spaces designated for the storage of this type of waste products, inasmuch as due to the particular shape and bulkiness of the tires, the volumetric space required for their storage is very large.

It is important to point out that the problem represented by the disposal of the large amounts of waste tires is not a problem that may be easily solved by providing available spaces for the storage of the same, because this represents only the first stage of a rather complex disposal procedure in which the subsequent stages must be very carefully analyzed in order to permit the election of the most viable alternative which will actually achieve a clean and suitable disposal of this type of waste products, since due to the physical and chemical properties of the tires, mainly formed by vulcanized rubber, the disposal or transformation thereof is extremely complicated and consequently, it is usually necessary to have to resort to the traditional process of burning the tires to finally dispose of the same, which burning operation, as it is very well known, causes a high concentration of contaminating gases that are directly emitted to the atmosphere. This undesirably brings about an ecological damage which is of great importance and beyond any remedy, and also causes damage to the health of the inhabitants of towns and cities.

Disposal of waste tires by using the same as a filler material for the building industry, also causes serious drawbacks due to the relatively high resistance of the materials with which the tires are manufactured and the large volumetric space occupied by each one of them, which tend to leave a relatively large number of hollow spaces that introduce serious difficulties during the stage of compacting the soils in which said waste tires are used as a filler, without any possibility of achieving the desired efficiency due to said hollow spaces.

On the other hand, the great demand and variety of applications of the different elements of a tire at an industrial scale, including the tread portion of the tire, the side walls and the bead of the same, has brought about the necessity of optimizing the cutting or slicing procedures for a waste tire so that the pieces or elements thus obtained may constitute elements of high quality that may be used as a raw material in secondary processes for the manufacture of other products. However, up to the present day, no machine or device capable of carrying out the slicing or cutting of the different constituting parts of a waste tire in an efficient manner exists in the art.

An efficient waste tire slicing or cutting machine would also be highly useful for the mere immediate disposal of tires having manufacturing defects, because the display of defective new tires that are not acceptable to customers without the immediate destruction thereof, frequently causes the tampering of the display shelves by unauthorized persons that could sell these defective tires as first quality tires, with the consequent loss of prestige of the trademark involved.

It may be mentioned that a great variety of cutting machines for certain specific materials have been enabled for attempting to carry out the slicing operation of waste tires, but said operation has not been successful because it is difficult to carry out, it normally produces defective products, and the inappropriate design causes the cutting elements of said machines to have a tendency to suffer severe alterations as to their configuration and, although sometimes the desired objective is accomplished, this type of machines is limited to divide the tire into two sections, which results in absolutely disadvantageous and unsuitable machines for cutting this type of products, because if the cutting of a predetermined element of a waste tire is required, a second machine must be used for attempting to accomplish said purpose.

Consequently, it has been sought to overcome the inconveniences of this type of machines and to provide a waste tire slicing machine that, besides eliminating the above mentioned drawbacks, may offer substantial advantages with respect to the cutting machines and devices of the prior art.

OBJECTS OF THE INVENTION

Having in mind the defects of the prior art cutting machines, it is an object to the present invention to provide a waste tire slicing machine which will be of a very practical, simple and economical construction and performance and yet, of high efficiency and reliability for slicing waste tires to recover the different elements of the same without requiring additional machines for said purposes.

Another object of the present invention is to provide a waste tire slicing machine which will be quite versatile for permitting the slicing of all types and sizes of tires existent in the market.

One more object to the present invention is to provide a waste tire slicing machine which will permit a considerable increase in the storage capacity for waste tires in any space available for said purpose.

One more object to the present invention is to provide a waste tire slicing machine which, besides permitting its adaptation and installation in any desired place, will function continuously and with extremely low operational costs.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of specific embodiments when read in connection with the accompanying drawings, in which:

DETAILED DESCRIPTION

Figure 1:
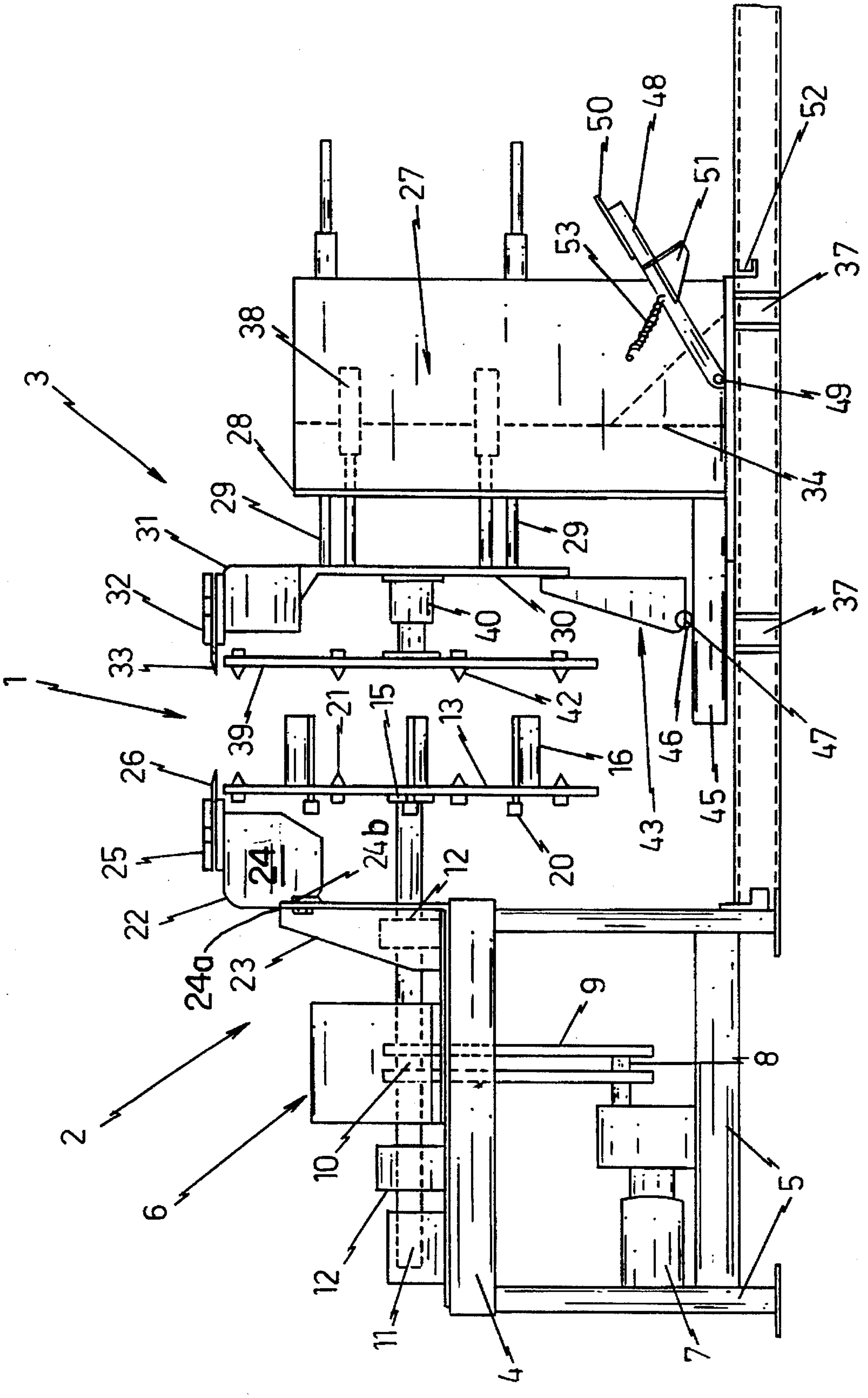
FIG. 1 is a side elevational view of a waste tire slicing machine built in accordance with a first embodiment of the present invention.
Figure 3:
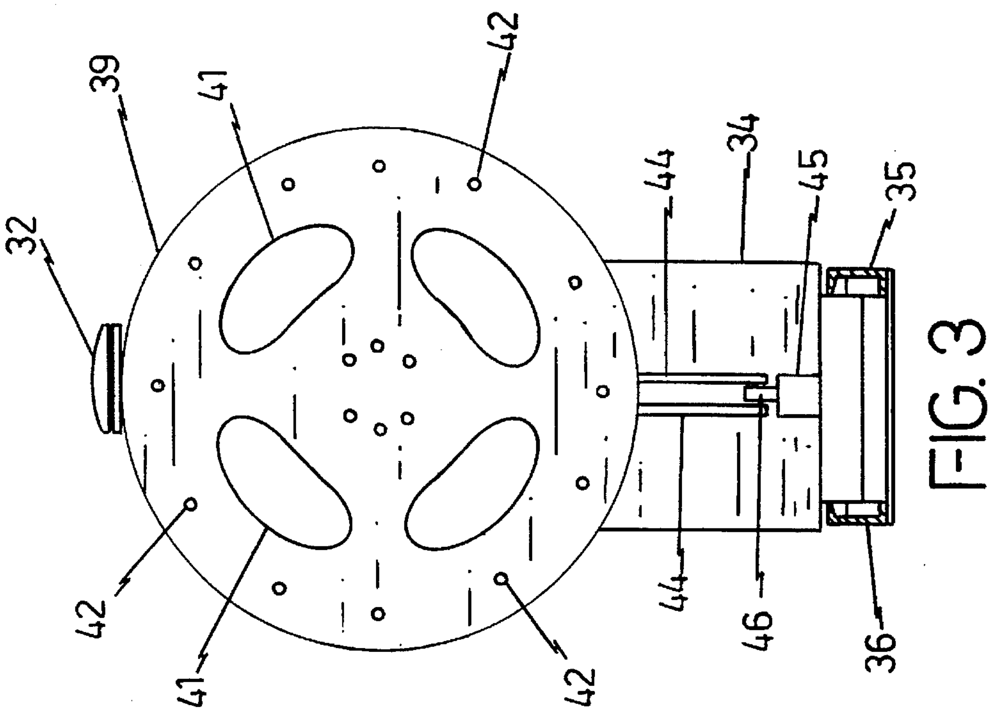
FIG. 3 is a front elevational view of the follower plate of the waste tire slicing machine shown in FIG. 1.
Figure 2:
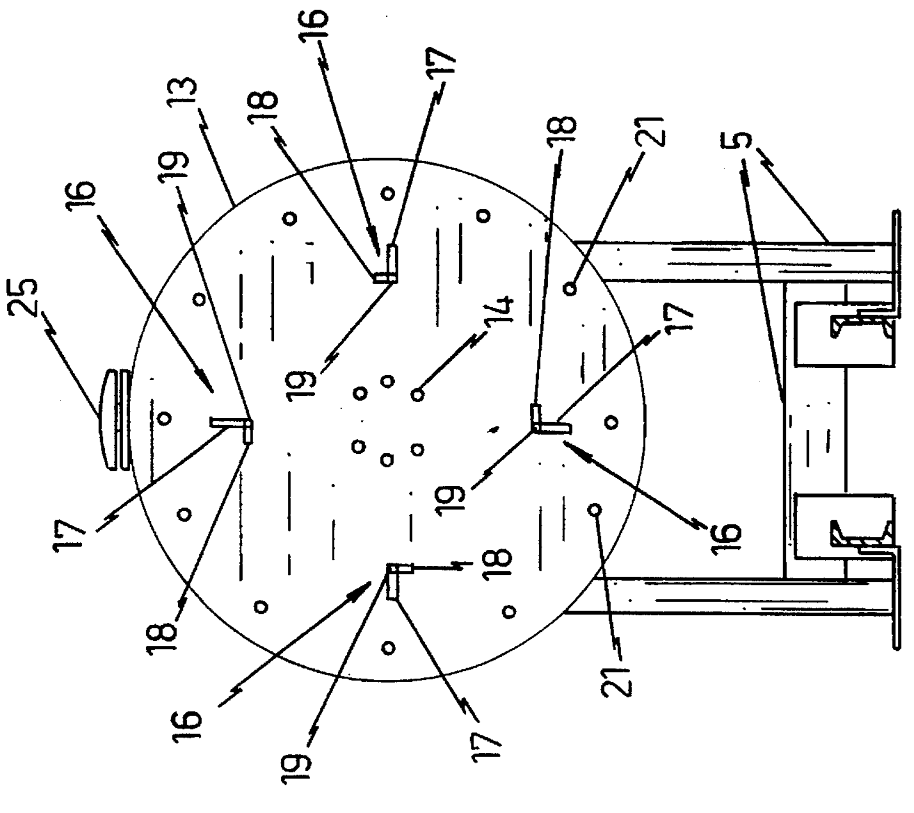
FIG. 2 is a front elevational view of the chuck plate of the waste tire slicing machine shown in FIG. 1.

Having now mope particular reference to the accompanying drawings and mope specifically to FIGS. 1 to 3 thereof, there is shown a waste tire slicing machine 1 built in accordance with a first embodiment of the present invention, which essentially comprises the combination of a stationary module 2 for applying a rotational force to a tire 60 (shown in FIG. 7) and at least one movable carriage 3 for supplying axial pressure to the tire, both of said modules being arranged in a horizontally alined position each other. The stationary module 2 for the application of rotational force to the tire basically comprises a fixed frame 4 vertically mounted on the floor and preferably built of structural steel with dimensions suitable for accommodating the different sizes and shapes of the tires existent in the market.

Said fixed frame 4 comprises a plurality of structural elements 5 which serve as a support for a transmission system 6 for rotational actuation, which transmission system may be electrical, pneumatic, hydraulic, mechanical and/or any other type of system permitting to accomplish the desired objective, but which having particular reference to the first embodiment of the present invention, comprises a transmission system for rotational actuation which includes an electrical motor 7 with a speed reduction gear providing a relationship of approximately 5:1, a driving sprocket 8 attached to the driving shaft of the motor/speed reducer assembly 7, a transmission chain 9 coupled to said driving sprocket 8 and to a driven sprocket 10 which in turn is coupled to a shaft 11 rotatively supported on journals 12 in each one of its ends and through which ultimately the corresponding rotational force is transmitted to a chuck plate 13.

Said chuck plate 13 is an interchangeable plate, preferably of a circular and flat shape, preferably built of steel and having dimensions and thickness In accordance with the tire 60 to be accommodated therein. Chuck plate 13 comprises a plurality of bores 14 (FIG. 2) concentrically located around its center portion order to permit the coupling and attachment of said chuck plate with said shaft 11 which in its connecting end comprises a coupling device 15 in the form of a flange with bores, such that when the plurality of bores 14 of said chuck plate 13 is made to match with the bores of the coupling device 15, the coupling and attachment of both components may be effected trough a simple and practical fastening system comprising threaded bolts and fastening nuts, by which means the chuck plate 13 may be easily disengaged from the shaft 11 for interchanging the same with other sizes and types of chuck plates.

The above mentioned chuck plate 13, as best shown in FIG. 2 of the accompanying drawings, comprises a variable diameter supporting system for waste tires which essentially comprises a plurality of tire supporting pin assembly 16 which extend perpendicularly of chuck plate 13 concentrically and equidistantly distributed with respect to said plurality of bores 14 on the surface of the chuck plate that confronts the movable carriage 3. Each supporting pin 16 assembly includes a pair of plates 17 and 18 perpendicularly attached along their inner edges on the pine which may be a metallic bar as shown by 19 which preferably has a circular section and crosses the chuck plate 13 for coupling the same to a spring biased nut 20.

The plate 17 of the supporting pin 16 has a width which is larger than the width of plate 18, as more clearly shown in FIG. 2 and each supporting pin may be rotated over its axis constituted by bar 19 upon releasing the bias exercised in the axial direction by the spring biased nut 20, to arrange the same at any angular position between a first position in which plate 17 is arranged in the radial direction and a second position in which palate 18 is arranged in the radial direction, whereby the mounting of waste tires of different sizes by contacting the beads 63 and 65 of the tire 60 (FIGS. 4 and 7) with the outer longitudinal edges of said plates 17 and 18 which maintain a fixed position with respect to a predetermined inclined angle, is rendered possible.

A plurality of spikes 21 are arranged and distributed concentrically on the surface of said chuck plate 13 which confronts said movable carriage 3, near the periphery thereof, in order to penetrate into the side wall 62 of the tire 60 (see FIG. 7) in order to firmly fasten the tire when pressing the side faces of said tire over the chuck plate 13 during the slicing operation, so as to permit the transmission of the rotating force when the movable carriage 3 exercises the corresponding operative pressure as will be described in more detail hereinbelow.

A knife positioner and adjusting head 22 for the cutting knives is mounted on a supporting structure 23 fixed to the frame 4, behind said chuck plate 13, and comprises a height adjusting mechanism 24 including a plurality of steps such as **24*a* and 24*b* arranged at its side faces for permitting the mounting of the head 22 at different heights on said supporting structure 23. Said height adjusting mechanism for variation of height of the knives, however, may be built in many other ways, such as for instance, it may comprise a simple manual mechanical device of the type of a radially arranged notch and mounting screw assembly, or of the cam type, or it may be a hydraulic, pneumatic and/or any other type of mechanism suitable for permitting the controlled radial displacement of said positioner and adjusting head 22, in order to accommodate different diameters of the tire which is to be sliced. In the particular embodiment shown in FIG. 1, when the positioner and adjusting head 22 is displaced by any such mechanism radially outwardly or inwardly, the plurality of steps 24*a* and 24*b* will permit said positioner and adjusting head 22 to bear on the supporting structure 23** at the desired height.

A knife-holder 25 is fixed at the upper end of the head 22, and at least one slicing knife 26 is arranged in said knife-holder so as to extend perpendicularly to and over the edge of said chuck plate 13 beyond the front face thereof, in order to cut into the side face of the tire looking towards the chuck plate 13.

The movable pressure carriage 3 is essentially formed by a slidable frame 27, preferably built of structural steel, which comprises a supporting frame 28 attached by means of slidable guides 29 to a pusher plate 30 of a rectangular and flat shape, parallely and vertically arranged with respect to said supporting frame 28. Pusher plate 30 serves as a support for a positioner and adjusting head 31 for the cutting knives, similar to the head 22 described above, and also comprising a knife-holder 32 which holds at least one slicing-knife 33.

The back surface of said frame 28 comprises at each one of its ends, a plurality of steel structural elements 34 arranged symmetrically, and comprising at their lower ends at least two pairs of metallic wheels 35 (FIG. 3) internally housed in a corresponding pair of tracks 36 also made of steel, fastened to the floor by means of a plurality of anchors 37, distributed along the same, said tracks 36 being arranged parallely to each other and performing as track guides for permitting the longitudinal displacement of said frame 27.

A pressure supplying system for exercising a constant pressure over the tire during the slicing operation, which may also be mechanical, hydraulic, pneumatic and/or any other type of system capable of supplying and maintaining a constant pressure on the tire to be sliced, comprises in the first embodiment of the invention illustrated in FIG. 1, a pneumatic pressure supplied system including at least one, but preferably a plurality of fluid actuated pistons 38 which permit, when operatively actuated, to push the pusher plate 30 against the fixed module to an initial position of operation, thus exercising at that point the required constant pressure on the tires until the slicing operation is completed, as will be more clearly explained hereinbelow.

A freely rotatable follower plate 39 of an interchangeable nature and of identical dimensions as the chuck plate 13 is freely rotatively coupled to said pusher plate 30 through a coupling device 40. The follower plate 39 comprises hollow spaces 41 in the form of lobes concentrically distributed on its surface at positions which match with the tire supporting pins 16 of the chuck plate 13, in order to permit the displacement of said supporting pins 16 through the same when the waste tire slicing machine 1 is in operation.

A plurality of spikes 42 of identical characteristics and dimensions as the plurality of spikes 21 of the chuck plate 13, are arranged and distributed also concentrically on the surface of said follower plate 39 which confronts the chuck plate of said stationary module 2, in order to permit the fastening of the tire by penetrating the side face 64 of the tire 60 looking towards the follower plate 39 during the slicing operation of the machine.

Pusher plate 30 is slidably supported on an auxiliary support 43 which permits a uniform distribution of pressure from the frame 28 to the follower plate 39. Said auxiliary support 43 is formed by a structural element 44 of a pyramidal channeled shape, the structural element 44 being at a vertical position and being joined at its upper end to the lower end of said pusher plate 30, and including at its lower end a roller 46 rotatively mounted by means of a bolt 47 to the structural element 44, for permitting the displacement of the pusher plate 30. A structural element 45 is arranged in a horizontal position and is attached to the lower end of the supporting frame 28, with the roller 46 rolling on the upper surface of said element 45, which thus serves as a guide for the displacement of pusher plate 30 and the corresponding freely rotatable follower plate 39.

A brake mechanism operating under counter-pressure with respect to said pressure supplying system, comprises a pair of side plates 48 parallely arranged to each other over each one of the tracks 38 and interconnected at their lower ends by means of a transverse bolt 49 to the slidable frame 27, such as shown in FIG. 1 of the drawings, while the opposite ends are fastened by means of a transverse plate 50 performing as a pedal for positioning said brake mechanism.

Each one of said side plates 48 also comprises at least a fastening and positioning device 51 for the brake, preferably of a triangular shape, located near said transverse plate 50, which is housed within ratchet-type anchoring devices 52 for permitting the corresponding positioning of said brake mechanism at selected positions along the tracks 36. At least a spring 53 under tension is located between the structural elements 36 and said fastening and positioner device 51 for the brake, such that, when the movable carriage 3 is displaced towards the stationary module 2, and the pusher plate 30 exercises pressure against the follower plate 39 and through the tire 80 also against the chuck plate 13, said spring 53 will exercise a constant tension in an inverse sense to the operational pressure, thus retaining the fastening and positioner device 51 trapped by the corresponding ratchet-type anchor 52 and fixing the operational position of the movable carriage 3, and allowing that, when the pressure exercised by said carriage 3 is released, the tension exercised by said spring 53 will also be released and will permit the release of the fastening and positioner device 51 from the ratchet-type anchor 52 and the displacement of the movable carriage 3 to its initial or inoperative position.

Figure 4:
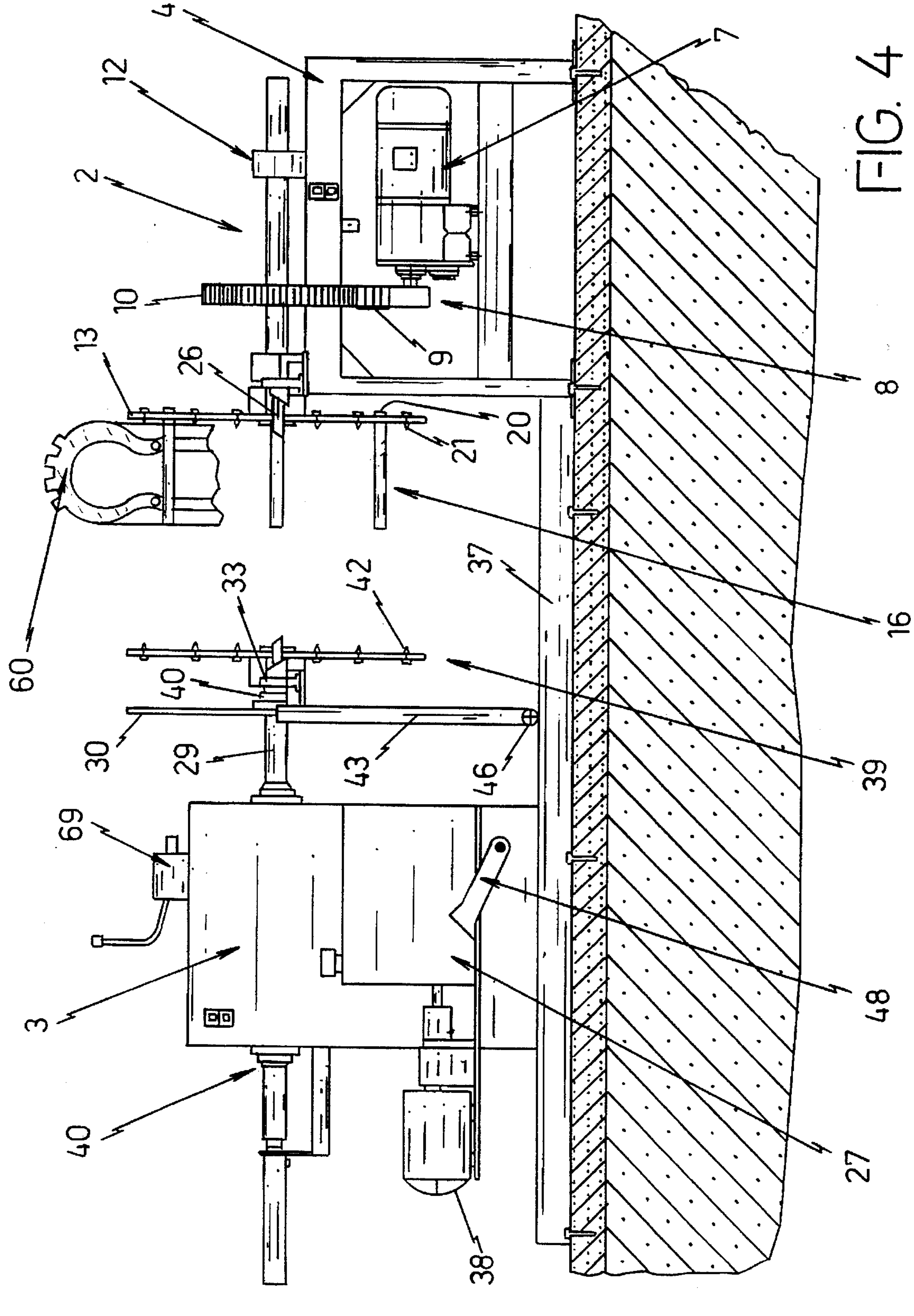
FIG. 4 is a view similar to FIG. 1 of a waste tire slicing machine built in accordance with a second embodiment of the present invention.
Figure 6:
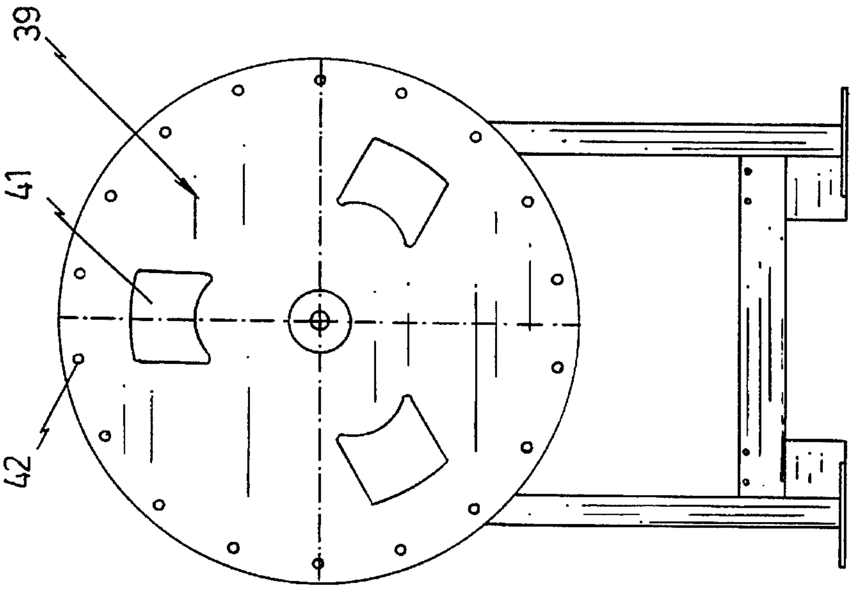
FIG. 6 is a front elevational view of the follower plate of the machine illustrated in FIG. 4.
Figure 5:
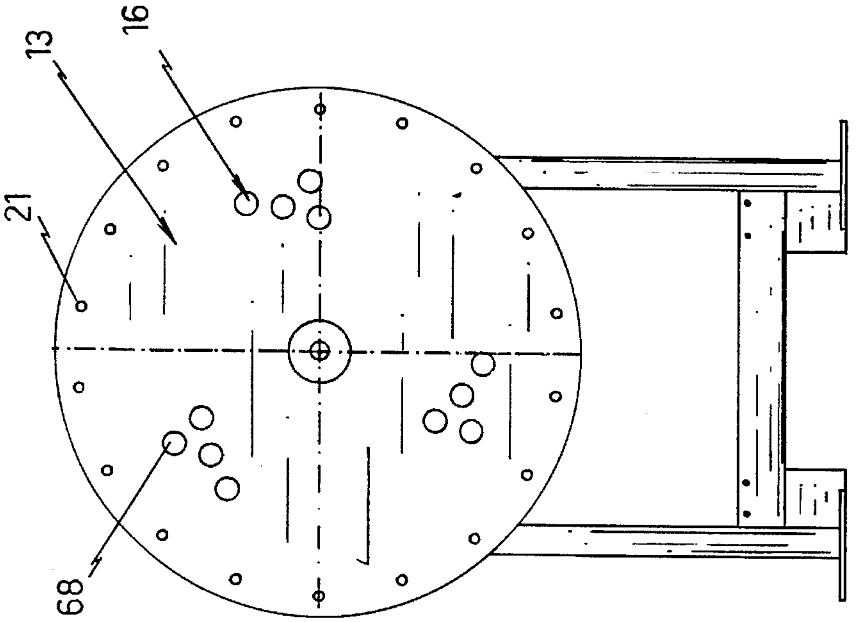
FIG. 5 is a front elevational view of the chuck plate of the machine of FIG. 4.

Having now reference to FIGS. 4, 5 and 6 of the drawings, in which the same reference numerals are used to identify similar parts, there is shown a waste tire slicing machine practically identical to the one described in relation to and shown in FIGS. 1 to 3 above. The only essential modification contained in the machine illustrated in FIGS. 4 to 6 of the drawings with respect to the machine shown in FIGS. 1 to 3, is the fact that the tire 60, which is illustrated as a fragment in cross-section in FIG. 4, is supported supporting the beads of the tire by means of a plurality of pins 16 constituted by single metal rods located on the chuck plate 13 in positions suitable to fit the inner diameter or bead diameter of the tire 60. The pins 16 are supported on the chuck plate 13 by means of respective nuts 20 and said pins 16, as more clearly shown in FIG. 5 of the drawings, may be located in a plurality of bores 68, which are placed in positions along the radius of the chuck plate 13, such that they may fit different sizes of tires. For changing the position of the pins 16, obviously, the nuts 20 are released and the pin is changed from one of the bores 68 to another selected bore, with the same being repeated for each pin which, in the particular embodiment shown in FIGS. 4 to 6, are provided in number of 3.

The freely rotatable follower plate 39 has corresponding openings 41 to permit the passage of the pins 16 therethrough, which in this particular embodiment are also provided in a number of three and of a size and shape suitable for permitting the passage of the pins 16 whichever bore 68 is used for their location.

Figure 7:
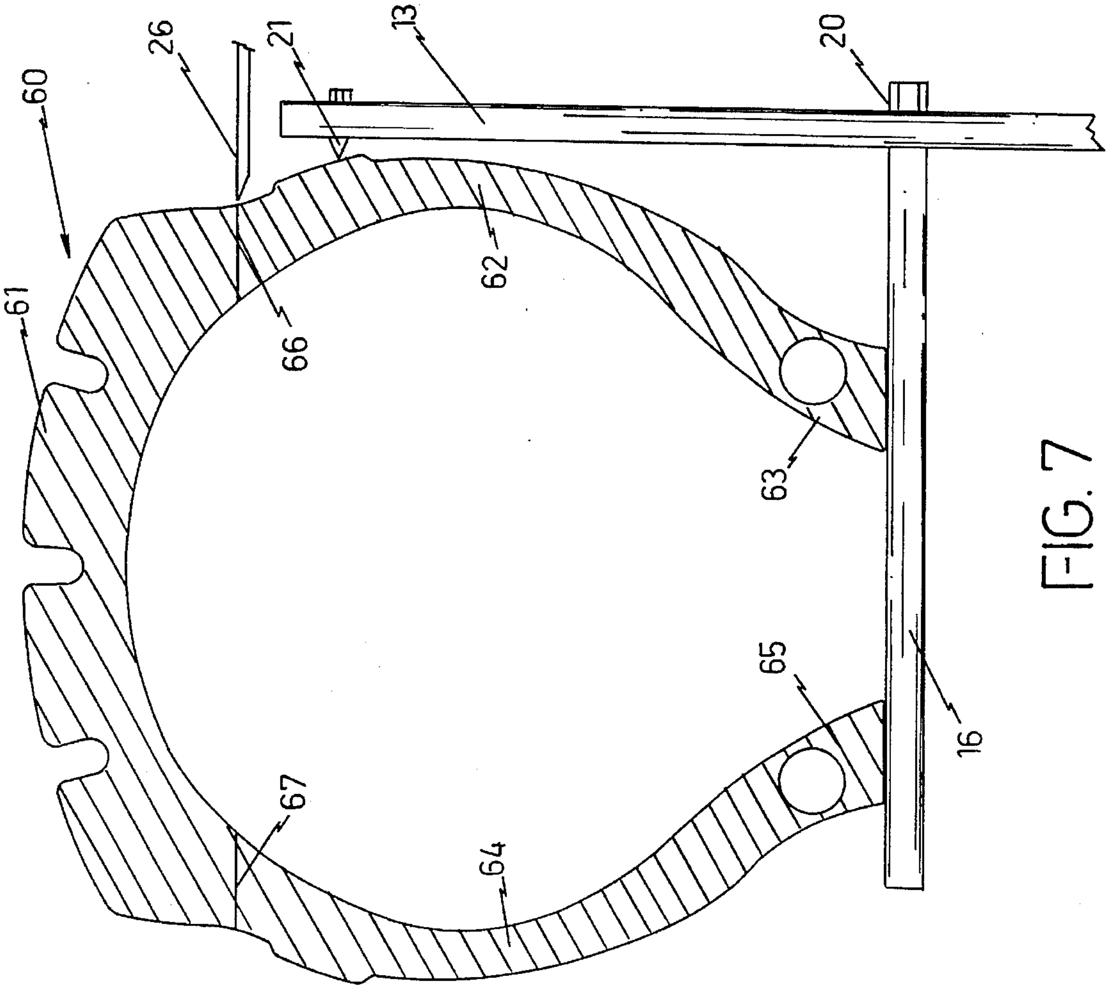
FIG. 7 is a fragmentary diagrammatic elevational view of a tire as mounted on the chuck plate of the machine of the present invention.

Both the chuck plate 13 and the follower plate 39 are provided along the periphery thereof with spikes 21 for the chuck plate and 42 for the follower plate, said spikes, as more clearly shown in FIGS. 4 and 7 of the drawings, serving as a means for fixing the position of the tire 60 to rotate in unison with the chuck plate 13 and the follower plate 39.

The remaining parts of the machine built in accordance with this second embodiment of the invention are strictly the same or quite similar to the corresponding parts of the machine of the first embodiment illustrated in FIGS. 1 to 3, whereby it is not considered necessary to describe them again. FIG. 4, however, shows a solenoid valve control 69 to control the pressure exercised by the pressure supplying system for the follower plate 39.

FIG. 7 is a fragmentary cross-sectional view seen from the top of FIG. 4, and showing the cross-section of the tire 60 as arranged around the supporting pins 16 attached to the chuck plate 13 by means of the nuts 20, and also showing the spikes 21 in a position suitable for trapping the side faces 62 of the tire 60 when pressure is exercised by means of the opposite follower plate 39. The knives 26 which are positioned along a horizontal imaginary line passing through the diameter of the chuck plate, when the follower plate 39 presses on the tire 60, will penetrate through the wall of the tire and will cut the tire along the line 66. The opposite knife 33, mounted on the movable carriage 3 (not shown in FIG. 7), will also make a cut 67 at the opposite side face 64 of the tire 60, thus slicing the tire in three different slices, namely, one containing the tread portion 61 of the tire, and two others comprising the side faces 62 and 64 of the tire together with their respective beads 63 and 65.

The operation of the machine is extremely simple, because in order to slice a waste tire, it is only necessary to accommodate the beads of the waste tire to be supported by the tire supporting pins 16 of the machine, as more clearly shown in FIGS. 4 and 7 of the drawings, followed by actuation of the movable carriage 3, in order to approach the follower plate 39 to the chuck plate 13 supporting the tire, such that the tire supporting pins 16 pass through the corresponding bores 41 of the follower plate, and pressure is exercised on the tire 60 by means of the pusher plate 30 so that the spikes 21 and 42 of both plates are inserted into the side faces of the tire, and the rotational unit of the fixed module 2 is then actuated, such that the tire will rotate in unison with both plates 13 and 39, whereafter the pressure of the follower plate 39 is increased by further moving the pusher plate 30 against the chuck plate 13, forcing the respective knives 26 and 33 to penetrate the tire and slice the same as more clearly shown in FIGS. 4 and 7 of the drawings.

It is to be noted that the arrangement of parts for the waste tire slicing machine built in accordance with the two above described embodiments of the present invention must be regarded as illustrative, inasmuch as many obvious modifications of the arrangement of said parts will be quite apparent to any one skilled in the art. For instance, the fixed module 2 of the slicing machine may be modified by including a symmetrically arranged chuck plate assembly connected to the driving shaft 11 thereof, and an additional movable carriage 3 may be included in opposition to said additional chuck plate assembly in order to constitute a duplex machine capable of simultaneously slicing two tires. Also, the chuck plate assembly could be arranged in a revolver-type arrangement to improve the speed of replacement of the chuck plates.

It may be seen from the above that a very simple and versatile waste tire slicing machine has been provided, which solves in a practical manner the problems encountered in the storage and disposal of waste tires, including new tires having manufacturing defects, which permits the immediate destruction of defective and unacceptable tires to avoid the possibility of mistakes by the salesmen who could erroneously sell such defective tires as first quality tires, and which definitely provides a practical method which may assist in preventing the disposal of waste tires by the traditional burning method, thus avoiding a serious cause of damage to the environment.

Although certain specific embodiments of the present invention have been shown and described above, it is to be understood that many modifications thereof are possible. The present invention, therefore, is not to be restricted except insofar as is necessitated by the prior art and by the spirit of the appended claims.

What is claimed is:

1. A waste tire slicing machine comprising:

a stationary module and a confronting movable carriage;

a rail on which said movable carriage is mounted to move towards and away from said stationary module;

brake means for stopping said movable carriage at a desired position on said rail, and brake releasing means to disengage said brake means from said rail;

said stationary module comprising a first frame, a rotatable shaft rotatively supported on said first frame, a rotatable chuck plate coupled to said shaft for rotating therewith, a motor coupled to said shaft for rotating said shaft and said chuck plate, a plurality of tire supports generally perpendicularly projecting from the face of said chuck plate arranged in an array for supporting the beads of a tire adjacent the face of said chuck plate, and first cutting means having one end mounted to said first frame and having a sharp edge at the opposite end projecting generally perpendicularly a predetermined distance from the face of said chuck plate;

said movable carriage comprising a second frame, a pusher plate slidably mounted on said second frame, a rotational follower plate rotatively supported on said slidable pusher plate coaxial and parallel with respect to said slidable pusher plate and to said chuck plate, pressure supplying means coupled to said slidable pusher plate for driving said pusher plate and said follower plate toward said chuck plate, a plurality of hollow gaps in said follower plate aligned with said tire supports to permit the passage of the tire supports when said follower plate approaches said chuck plate, and second cutting means having one end fixed to said slidable pusher plate and having a sharp edge at the opposite end projecting a predetermined distance generally perpendicularly from said follower plate, said sharp edge of said second cutting means being aligned with said first cutting means of said stationary module.

2. A waste tire slicing machine according to claim 1 wherein both said chuck plate and said follower plate further comprise a plurality of spikes arranged in an array for penetration into a tire mounted on said chuck plate to provide rotation of said tire with said chuck plate and follower plate.

3. A waste tire slicing machine according to claim 2 wherein said tire supports of said chuck plate include means for changing the radial position of said tire supports to accommodate tire beads of different diameters.

4. A waste tire slicing machine according to claim 3 wherein said tire supports comprise a plurality of elongated angle members fixed to said chuck plate by fastening means, each said elongated angle member formed by a wide web and a transverse narrow web.

5. A waste tire slicing machine according to claim 4 wherein said chuck plate has a plurality of bores over its surface arranged in an array which permits locating said pins in selected ones of said bores for accommodating different bead diameters of tires.

6. A waste tire slicing machine according to claim 4 wherein said changeable positioner means include a plurality of bores distributed over the surface of said chuck plate means in an array which permits locating said pins in selected ones of said bores for accommodating different bead diameters of tires.

7. A waste tire slicing machine according to claim 5 further comprising axially resilient means for coupling said elongated angle members to said fastening means for permitting, upon release of the coupling pressure exerted by said resilient means, rotation of said elongated angle members over their axes between one position in which the wide web is directed radially outwardly of the chuck plate and another position in which the narrow web is directed radially outwardly of the chuck plate to accommodate different bead diameters of tires.

8. A waste tire slicing machine according to claim 1 wherein both said first and second cutting means include a knife supported by a knife-holder, and positioning means in said knife-holder to vary the distance of the knife from the center of its respective chuck plate and follower plate to slice different sizes of tires at preselected cutting lines.

9. A waste tire slicing machine according to claim 8 wherein said positioning means includes a plurality of steps to position a said knife.

10. A waste tire slicing machine according to claim 1 wherein said pressure supplying means coupled to said slidable pusher plate comprises fluid cylinder and piston means coupled between said slidable pusher plate and said second frame, said slidable pusher plate being slidably mounted on rail members forming part of said second frame.

* * * * *